June 27, 1950     W. J. CAMPBELL     2,512,609
SAFETY STOP

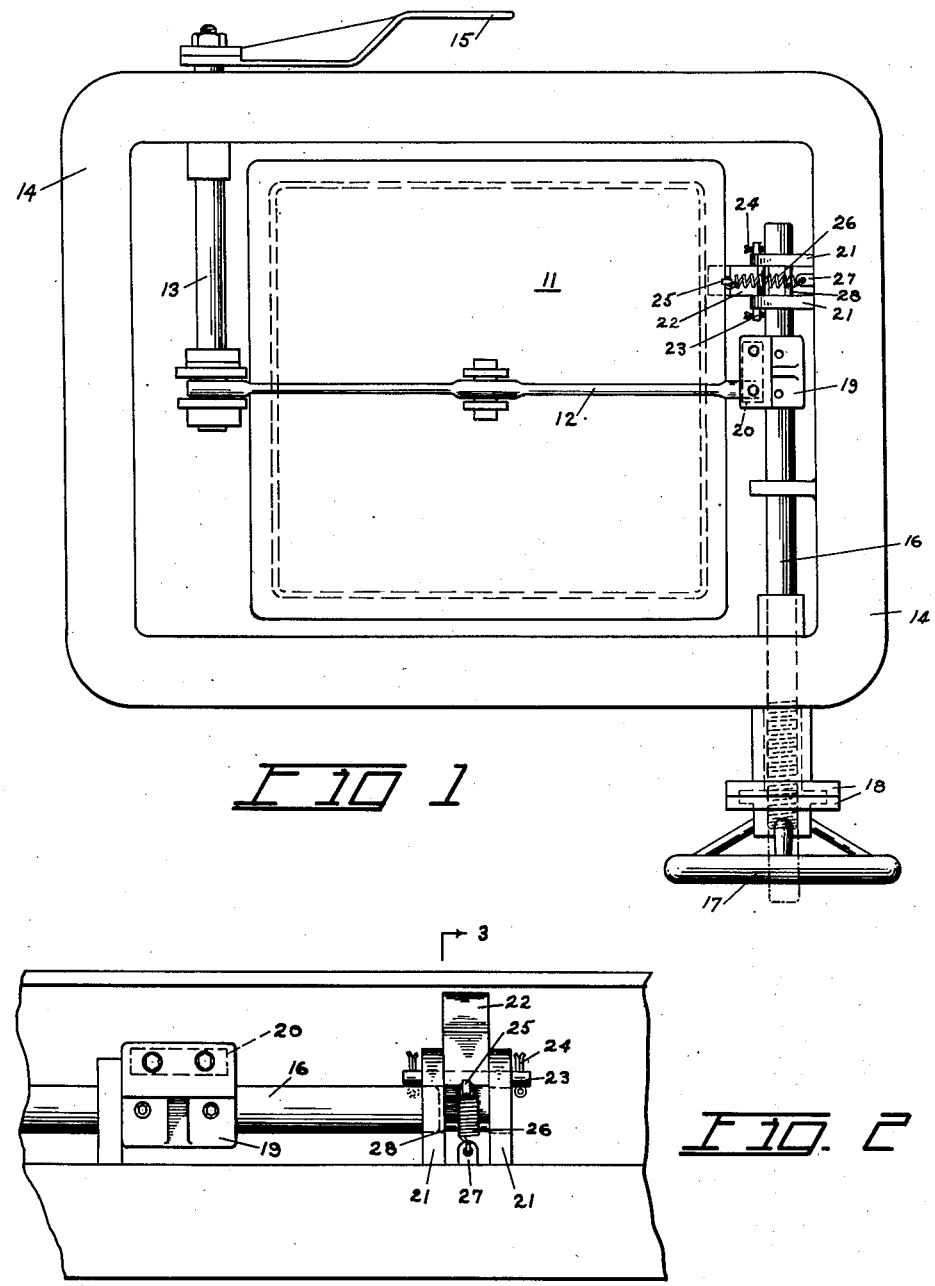

Filed Aug. 8, 1945     2 Sheets-Sheet 2

INVENTOR.
WILLIAM J. CAMPBELL.
BY
Ralph L. Chappell
ATTORNEY.

Patented June 27, 1950

2,512,609

UNITED STATES PATENT OFFICE 2,512,609

SAFETY STOP

William J. Campbell, New York, N. Y.

Application August 8, 1945, Serial No. 609,710

2 Claims. (Cl. 292—155)

(Granted under the act of March 3, 1883, as amended April 30, 1928; 370 O. G. 757)

This invention relates to a safety stop useful in conjunction with locking devices on ventilation valves, watertight doors and the like.

Many types of closure are locked by mechanism comprising a shaft or rod that is moved lineally into locking position after the closure is in the closed position, preventing the closure from being opened until such shaft or rod is withdrawn from the locking position. In most cases the locking mechanisms of such closures can be moved into locking position while the closures are in open position. When this is the case, the locking mechanisms prevent quick closing of the closures, since they cannot be closed until the locking mechanisms are withdrawn from locking position, an unsatisfactory and unsafe condition.

It is an object of this invention to provide a safety stop for locking mechanisms associated with closures preventing said locking mechanisms from being moved into locking position while said closures are open.

Further objects and advantages of this invention, as well as its construction, arrangement and operation, will be apparent from the following description and claims in connection with the accompanying drawings, in which, Fig. 1 is a plan view of the safety stop of this invention associated with a ventilation valve, the valve being in closed and locked position.

Fig. 2 is an enlarged fragmentary plan view of the safety stop associated with the ventilation valve of Fig. 1 and its locking mechanism, the latter being shown in unlocked position.

Figure 3:
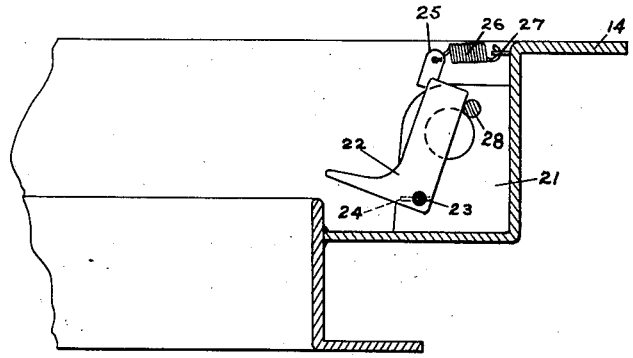
Fig. 3 is a sectional view of the device taken along the line 3—3 of Fig. 2.

Fig. 1 shows a closure 11 secured to the center of strongback 12. Strongback 12 is radially affixed to shaft 13, rotatably mounted in frame or flange 14. Shaft 13 can be rotated by means of handle 15.

Slidably mounted on flange 14 opposite shaft 13 is a locking rod or shaft 16. One end of locking shaft 16 is threaded and in threaded engagement with handwheel 17, the hub of which is rotatably retained by thrust collars 18. Wedge support 19 is fixedly secured to locking shaft 16 and supports wedge 20 that is positioned and adapted to move into and out of bearing engagement with the end of strongback 12 as locking shaft 16 is moved into and out of locking position by rotation of handwheel 17.

The safety stop comprises two pads 21 mounted on flange 14, and drilled to permit passage of locking shaft 16 therethrough. Bellcrank 22 is pivotally mounted between pads 21 on pin 23 that is suitably retained, as by cotter keys 24. Lug 25 extends from one arm of bellcrank 22 and is joined by coil spring 26 to lug 27 extending from flange 14. Stop 28 extends between pads 21 and limits the movement of that arm of bellcrank 22 acted upon by spring 26.

The operation of the safety stop is as follows. The heavier arm of bellcrank 22, that acted upon by spring 26, is normally maintained by spring 26 in a position between pads 21 directly in the path of locking shaft 16 (Figs. 2 and 3). This condition positively prevents locking shaft 16 from being moved into locking position, and assures that wedge support 19 is not in position to interfere with quick closing of closure 11.

Figure 4:
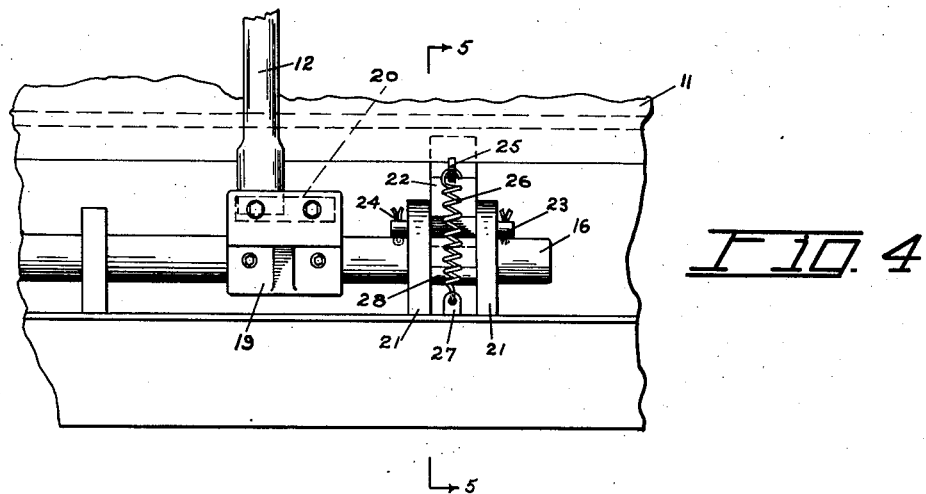
Fig. 4 is an enlarged fragmentary plan view of the safety stop associated with the ventilation valve of Fig. 1 and its locking mechanism, the latter being shown in locked position.
Figure 5:
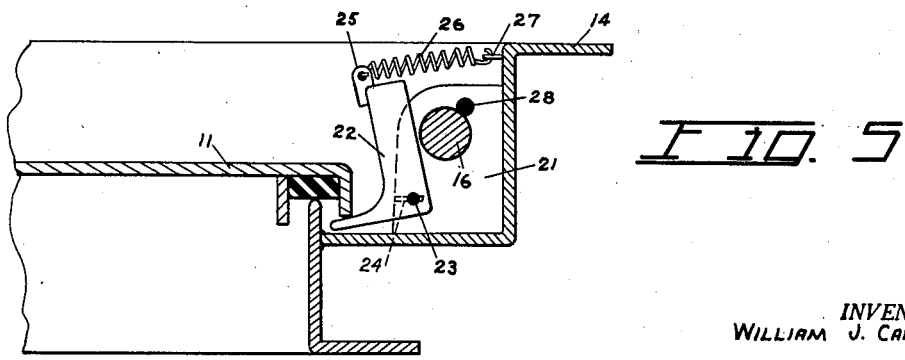
Fig. 5 is a sectional view of the device taken along the line 5—5 of Fig. 4.

When closure 11 is closed, an edge thereof acts upon an arm of bellcrank 22, which is so designed and positioned that closing of closure 11 will cause bellcrank 22 to pivot sufficiently against the force of spring 26 so that the heavy arm of bellcrank 22 is completely withdrawn from the path of locking shaft 16. Locking shaft 16 can then be moved into locking position, and wedge 20 brought into bearing engagement with the end of strongback 12 (Figs. 4 and 5). When locking shaft 16 is withdrawn from locking position and closure 11 is opened, spring 26 returns bellcrank 22 to safety position preventing movement of locking shaft 16 while closure 11 is open.

It will be apparent that the locking mechanism and safety stop can alternatively be mounted on closure 11, with an arm of bellcrank 22 positioned and disposed to be engaged by flange 14, or by a lug projecting therefrom, as closure 11 is closed.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A locking device for use aboard ship with a watertight hatch and supporting frame, said device comprising a manually actuated bolt mounted in exposed position for sliding movement on the frame into and out of locking position, means on said bolt in exposed position for engaging the hatch in locking position, a pair of parallel spaced lugs in exposed position on said frame and disposed across the path of bolt travel at the end of the path, said lugs having aligned openings to permit travel of the end of the bolt therethrough into locking position, a removable pin in exposed position between said lugs adjacent the aligned openings and parallel to said bolt, a bellcrank rotatably mounted in exposed position on said pin for movement into and out of the path of bolt travel, a stop between said lugs in exposed position on the opposite side of the openings from said pin for limiting movement of the bellcrank into the path of bolt travel, a spring in exposed position between one arm of said bellcrank and the frame for urging the bellcrank into the path of bolt travel and toward said stop, the other arm of said bellcrank being engageable by the hatch in closed position to move said bellcrank out of the path of bolt travel against the action of said spring.

2. A locking device for use aboard ship with a watertight hatch and supporting frame, said device comprising a manually actuated bolt mounted for sliding movement on the frame into and out of locking position, means on said bolt for engaging the hatch in locking position, a pair of parallel spaced lugs on said frame and disposed across the path of bolt travel at the end of the path, said lugs having aligned openings to permit travel of the end of the bolt therethrough into locking position, a removable pin between said lugs adjacent the aligned openings and parallel to said bolt, a bellcrank rotatably mounted on said pin for movement into and out of the path of bolt travel, a stop between said lugs on the opposite side of the openings from said pin for limiting movement of the bellcrank into the path of bolt travel, a spring between one arm of said bellcrank and the frame for urging the bellcrank into the path of bolt travel and towards said stop, the other arm of said bellcrank being engageable by the hatch in closed position to move said bellcrank out of the path of bolt travel against the action of said spring.

WILLIAM J. CAMPBELL.

REFERENCES CITED

The following references are of record in the file of this patent:

UNITED STATES PATENTS

| Number | Name | Date |
|---|---|---|
| 724,899 | Livingston | Apr. 7, 1903 |
| 912,817 | Davis | Feb. 16, 1909 |
| 1,030,192 | Kutz | June 18, 1912 |
| 1,186,315 | Holland | June 6, 1916 |
| 1,306,560 | Page | June 10, 1919 |
| 1,391,005 | Palmer | Sept. 20, 1921 |